Sept. 15, 1936.  E. H. PETTLER  2,054,684
METHOD OF MAKING BRICK CORNERS
Filed Aug. 21, 1934
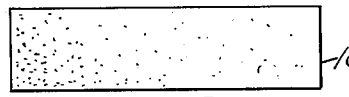
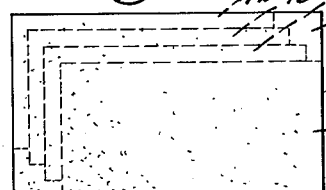
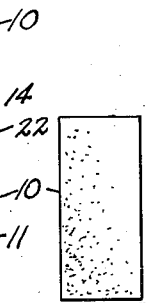
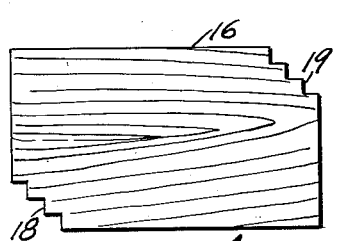
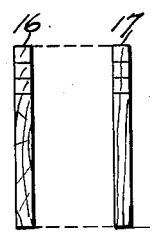
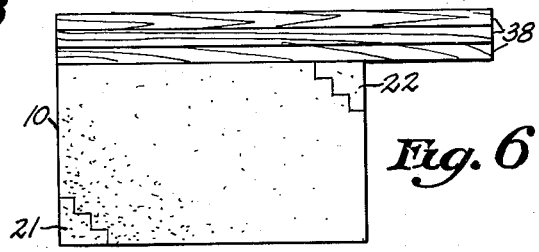
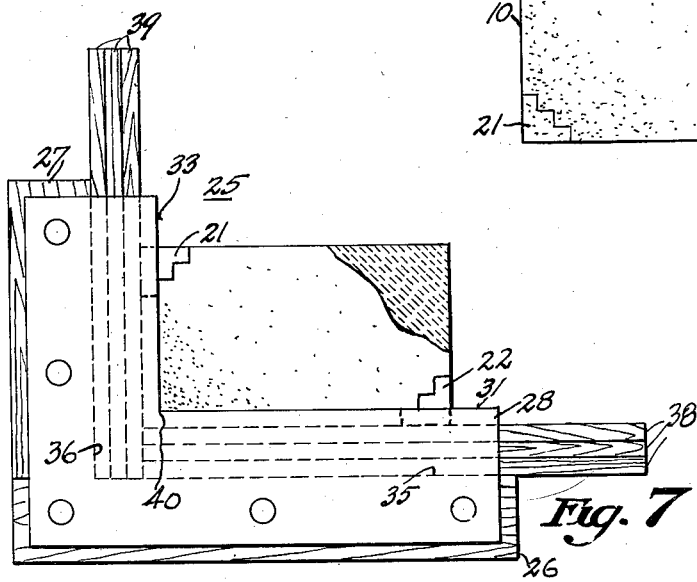
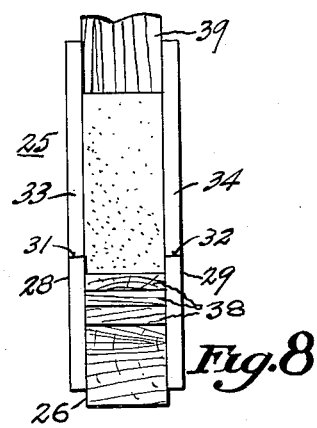
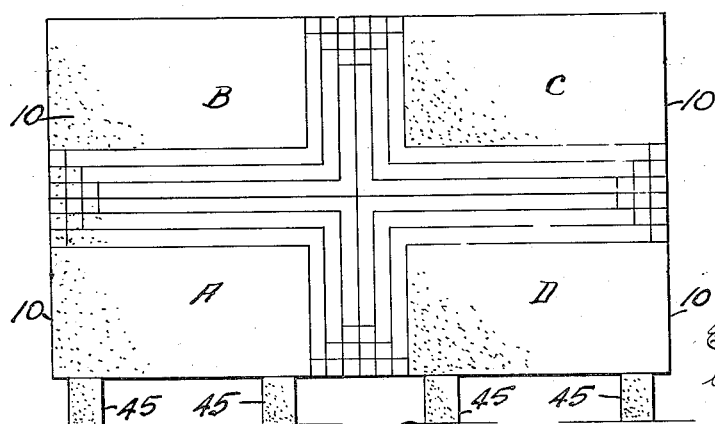
INVENTOR
Eugene H. Pettler
by J. E. Foster
his attorney Patented Sept. 15, 1936

2,054,684

UNITED STATES PATENT OFFICE 2,054,684

METHOD OF MAKING BRICK CORNERS

Eugene H. Pettler, Beaver Falls, Pa.

Application August 21, 1934, Serial No. 740,781

2 Claims. (Cl. 25—156)

This invention relates to clay brick or tile corners or angles, and particularly to the method of, and apparatus for, making them.

One object of my invention is to provide a method of and apparatus for, manufacturing brick-simulating corner angles for use with brick slabs or tile in making up brick veneer walls.

Another object of invention is to provide clay brick corners of the foregoing type that shall retain an initial predetermined shape throughout its process of formation, whereby the finished product shall be substantially uniform in comparison with a standard.

A further object of my invention is to provide a method of and apparatus for forming brick or tile corner angles which shall ensure a high percentage of first grade quality brick corners with a minimum amount of deformation and of improper coloring in the finished product.

Another object of my invention is to provide a process of manufacturing clay brick corner angles which shall ensure a relatively high degree of color correspondence and uniformity in the exposure surfaces of the clay brick corners.

Another object of my invention is to provide an apparatus for forming clay brick corners which shall ensure uniformity and constancy in the size and shape of the corner elements.

I have illustrated one type of apparatus for shaping the clay brick corners, as shown in the accompanying drawing, in which Figure 1 is a front elevational view of a clay body from which the corner sections are to be formed;

Figure 2 is a plan view of the body of the clay shown in Fig. 1;

Figure 3 is an end elevational view of the clay body shown in Fig. 1;

Figure 4 is a side elevational view of a templet for use with the clay body in Fig. 1 to serve as a guide for a tool to cut off the excess end pieces of the clay, adjacent the end surfaces of the corners to be formed;

Figure 5 is an end elevational view of two templet plates such as shown in Fig. 4, in spaced position corresponding to their location, during operation, against the block of clay as shown in Fig. 3;

Figure 6 is a side elevational view of the block of clay in Fig. 1 after the excess corners have been severed from the main body of clay;

Figure 7 is a side elevational view of a framing jig in which the clay body is supported while the angular portions, from which corners are to be formed, are severed from the body;

Figure 8 is an end elevational view of the jig shown in Fig. 7; and,

Figure 9 is a front elevational view, illustrating the manner in which four shaped clay bodies are arranged in a kiln to protect the outer corners during burning.

As illustrated in Figs. 1, 2, and 3, a body of clay 10 from which the brick corner angles are to be formed is shaped to the proper dimensions to enable one standard brick element 11 and three or more corners or angles 12, 13, and 14, to be formed from the clay body, as indicated by the dotted lines in Fig. 1. The height of the brick portion 11 corresponds to the width of a finished brick and the length of the brick portion 11 corresponds to the length of the finished brick.

The thickness of the corner elements 12, 13, and 14 that are to be formed, is the same in each case, which according to standard practice is one-half inch.

The corners 12, 13, and 14 are severed from the clay body along the dotted lines indicated in Fig. 1, in the jig shown in Fig. 7, as will be explained later.

The first operation after the clay body is shaped as shown in Figs. 1, 2 and 3, is to sever from the body such excess material as would be present at the respective ends of the corner angles when they are ultimately formed. Such excess material is severed from the body of clay by means of a thin steel wire after the clay body 10 is placed between two templet plates 16 and 17, as in Fig. 5, which may serve as guides for the cutting wire. The templets may be made of any suitable material, which for the present I have illustrated as being made of wood.

The templet plates 16 and 17 are provided with stepped or serrated edges 18 and 19 at diagonally opposite corners, as indicated in Fig. 4. The serrated edges serve as guides for the cutting wire by means of which the excess material is severed from the clay body 10. Such excess material is not removed from the clay body but is left in position thereon, as shown in Fig. 6.

The next operation involves cutting the corner angles to size and severing them from the clay body. This operation is performed on the jig frame 25 shown in Figs. 7 and 8.

The jig frame 25 consists essentially of a right angle support having a long horizontal base 26 and a vertical wall 27 forming a right angle with the base 26 at one end of the base. The width of the frame consisting of the base and the vertical wall corresponds to the width of the clay body 10, which is substantially the width of a finished brick.

Two guide plates 28 and 29 are secured to the support on opposite sides thereof to provide a confined space within which the clay body may be retained while the corner angles are severed from the clay body.

The corner angles are severed from the clay body by means of a thin steel wire in the same manner as the excess portions 21 and 22 were severed from the clay body in the previous operation, illustrated in Fig. 6. In the present severing operation, the top edges 31 and 32 of the guide plates 28 and 29 serve as runners or guide surfaces for the severing wire as it is moved through the clay body to sever the corner angles from the clay body. The vertical edges 33 and 34 of the side plates 28 and 29 of the jig also serve as guide edges for the wire for the corresponding side portions of the corner angles.

The guide edges 31 and 32 are spaced from the upper surface 35 of the base 26 by a distance that is a multiple of the thickness of a brick corner. Similarly the guide runner edges 33 and 34 are equally spaced from the back surface 36 of the vertical wall of the jig support.

In order to support the clay body at the proper distances above the base surface 35 and away from the wall surface 36, a group of horizontal paddles 38 are employed underneath the clay body and a group of vertical paddles 39 are employed at the end of the clay body, between the clay body and the respective surfaces 35 and 36.

The thickness of each of the paddles 38 and 39 corresponds to the thickness of the desired finished corner or angle, and in usual practice is one-half inch. The number of horizontal paddles employed, as well as the number of vertical paddles, corresponds to the number of corner angles to be formed from the body of clay. The next step in the shaping operation may now be considered, assuming the clay body has had the excess end material severed, but not separated, from the body, as shown in Fig. 6.

The group of horizontal paddles 38 is then placed upon the top of the clay body as shown in Fig. 6 and the clay body together with the paddles is then inverted and placed in the space between the guide plates 28 and 29 of the frame jig 25. The three vertical paddles 39 are placed behind the clay body, and the two sets of paddles and the clay body are assembled in the jig, as shown in Fig. 7. The first corner cutting operation is performed by running the wire through the clay along the upper edges 31 and 32 of the two guide plates 28 and 29, from the right hand end of the clay body to the vertex 40 of the angles in the side plates 28 and 29. The wire is then run down along the vertical edges 33 and 34 to the vertex, thus severing the first or outside corner angle 12 from the clay body. The entire clay body is left in position, however.

The bottom paddle of the horizontal group 38 and the rear paddle of the vertical group 39 are then removed, and the horizontal paddles with the clay body 10 are then moved inward against the rear vertical surface 36. The two cutting operations by means of the wire are then again performed on the clay body, thus severing the second corner 13 from the clay body. Again one of the horizontal and one of the vertical paddles are removed, and the third severing operation is performed by means of the wire to sever the third angle 14 from the body. The three corner angles have thus been severed from the clay body while being maintained in their initial relative positions on the clay body. The clay body is now of the shape and form shown in Fig. 1, with one brick element 11; three corner angles 12, 13, and 14; and the excess material 21 and 22 at the diagonally opposite corners of the clay body, at the ends of the corner angles.

The entire mass or body of clay is withdrawn from the jig, being handled by the brick portion 11, in order to obviate any physical contact with the corner angles that might displace them from their initial positions, or that might distort them from their preshaped dimensions or their relative locations. The clay bodies, after being so cut to form the corner angles, are then passed through drying chambers in which the clay bodies are gradually heated and dried to eliminate the moisture contents. After the clay bodies are dried, they are placed in a kiln to be burned.

When formed according to the procedure outlined, the clay corner angles are not touched or disturbed or shifted from their original positions, and therefore retain their original dimensions throughout the process of manufacture. The finished products are therefore substantially uniform in size and shape.

In order to procure a uniform coloring on the exposure side surfaces of the outer corner angles 12 of each body, four body units, A, B, C, and D, are assembled and positioned on supports 45 in the kiln, as shown in Fig. 9, so that the outer surfaces of the outer corner angles will be covered during the firing operation in the kiln, in the same manner as the inner corners are covered, by similar clay material. Such assemblies are stacked in the kiln with spacing to permit access of the heated gases to each unit assembly.

By shaping the clay corners or angles in position on the original body on which they are formed and then drying and burning the entire mass with each portion of the clay body in its original and initial position, the various side surfaces of the brick and of the corner angles, that are to be exhibited to view in a finished wall, are protected from the ambient air in the kiln during the firing operation. Each surface is therefore similarly heated by heat conducted to it from adjoining clay bodies. Consequently, the heating conditions are substantially constant and similar, thus ensuring a uniform burning and coloring of the contacting surfaces which become the exposure surfaces when the bricks are assembled in a wall.

The advantages resulting from such handling are twofold. First, the original right-angle shape of the corners is maintained throughout the entire process, so that a high degree of uniformity in the size and shape of the corner angles is established and maintained. Second, the exposure surfaces that will be exposed to view, when the corner angles are assembled in a veneer wall structure, will be substantially uniform and constant in color, due to the fact that all such surfaces were protected from the ambient air by being covered with clay during the burning operation, and were thus subjected to the same firing conditions.

My invention thus contemplates a clay brick or tile element of angular construction having relatively uniform dimensions and coloring in related units of the same batch, and also involves the method of and apparatus for handling a clay material, from which brick and corner angles are to be made, to establish, maintain, and preserve constant and uniform manufacturing conditions and results.

Although I have shown only three corner angles formed from each clay body, it will be understood that any desired number may be so formed. Likewise, the brick element 11 may be of standard brick dimensions, or otherwise, as may be desired.

My invention is not specifically limited to the detailed steps of the process in the sequence set forth, nor to the details of construction of the apparatus as shown, since they may be variously modified without departing from the spirit and scope of the invention as set forth in the appended claims.

I claim as my invention:

1. The method of making L-shaped brick veneer corners with their outer end faces simulating a standard building brick in appearance and size, which comprises, shaping a rectangular clay block so that one dimension is of the face width and the other dimensions greater than the finished corners, cutting said block at diagonally opposite corners to form the ends of the long and the short legs of the L-shaped corners, cutting said block parallel with the front and end faces thereof to form a plurality of nested L-shaped corners of the desired thickness, drying and firing the cut block as a unitary mass in a kiln, and subsequently dismembering the burnt block into its constituent parts.

2. The method of making L-shaped brick veneer corners with their outer end faces simulating a standard building brick in appearance and size, which comprises, shaping a rectangular clay block so that one dimension is of the face width and the other dimensions greater than the finished corners, placing said block edgewise on a plurality of gauge blocks in a wire cutter box having a vertical and horizontal guide, placing a plurality of gauge blocks at right angles to the bottom blocks to constitute abutments for the clay block at one end thereof, passing the cutting wire over the wire guides in a vertical and horizontal direction, successively removing a gauge block from beneath and the side of said clay block to displace said block relative to the wire guides, without dismembering the previously cut portions, passing the cutting wire over the guides for each adjustment of the clay blocks in a vertical and horizontal direction to form a plurality of nested L-shaped corners as determined by the thickness of the gauge blocks, removing the cut clay block as a unit mass from the cutter box, drying and firing it as a unitary mass in a kiln, and subsequently dismembering the burnt block into its constituent parts.

EUGENE H. PETTLER.